(12) United States Patent
Gridnev et al.

(10) Patent No.: US 6,388,036 B1
(45) Date of Patent: May 14, 2002

(54) OLIGOMERIZATION, POLYMERIZATION AND COPOLYMERIZATION OF SUBSTITUTED AND UNSUBSTITUTED α-METHYLENE-γ-BUTYROLACTONES AND PRODUCTS THEREOF

(75) Inventors: Alexei Alexeyevich Gridnev; Steven Dale Ittei, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/857,135

(22) PCT Filed: Nov. 30, 1999

(86) PCT No.: PCT/US99/28243

§ 371 Date: May 31, 2001

§ 102(e) Date: May 31, 2001

(87) PCT Pub. No.: WO00/35960

PCT Pub. Date: Jun. 22, 2000

Related U.S. Application Data

(60) Provisional application No. 60/112,457, filed on Dec. 16, 1998.

(51) Int. Cl.[7] ................................................ C08F 24/00

(52) U.S. Cl. ........................ 526/270; 526/172; 526/266; 526/268

(58) Field of Search .................................. 526/172, 266, 526/268, 270

(56) References Cited

FOREIGN PATENT DOCUMENTS

| | | | |
|---|---|---|---|
| EP | 0 722 960 A | * | 7/1996 |
| JP | 9012632 | * | 1/1997 |
| JP | 9012641 | * | 1/1997 |
| WO | 99/41218 | * | 8/1999 |

OTHER PUBLICATIONS

Hertler et al. Polym. Prepr. (1998), 29(2), 71–2.*

Sato et al. Makromol. Chem. (1984), 185(4), 771–86.*

* cited by examiner

Primary Examiner—Helen L. Pezzuto
(74) Attorney, Agent, or Firm—Steven C. Benjamin

(57) ABSTRACT

This invention relates to the oligomerization, polymerization and copolymerization of substituted and unsubstituted α-methylene-γ-butyrolactones and the products thereof, Cobalt (II) and cobalt (III) chain transfer catalysts are used to control the molecular weight and impart an aromatic functionality to the products formed.

15 Claims, No Drawings

OLIGOMERIZATION, POLYMERIZATION AND COPOLYMERIZATION OF SUBSTITUTED AND UNSUBSTITUTED α-METHYLENE-γ-BUTYROLACTONES AND PRODUCTS THEREOF

This application is a 371 of PCT/US99/28243 filed Nov. 30, 1999 which claims benefit of Prov. No. 60/112,457 filed Dec. 16, 1998.

FIELD OF THE INVENTION

This invention relates to the oligomerization, polymerization and copolymerization of substituted and unsubstituted α-methylene-γ-butyrolactones (MBLs) using cobalt chain transfer catalysts to control molecular weight.

TECHNICAL BACKGROUND

The free radical polymerization of α-methylene-γ-butyrolactone, as well as its copolymerization, is described by M. K. Akkapeddi, Polymer, vol. 20, 1979, pp. 1215–1216, and Japanese Patent Application 9012646. However, no catalysts were used and no end-group analyses were disclosed in any of these references.

It is known to use various cobalt complexes (e.g., cobaloximes) as chain transfer catalysts (CTC) to provide macromonomers which provide terminal double bonds for use in polymeric products. See commonly owned U.S. Pat. Nos. 5,310,807, 5,362,813, 5,412,039, 5,502,113, and 5,587,431 and WO 9525765. However, no examples of aromatic group formation during catalysis is shown as in the present invention.

The use of cobalt chain transfer catalysts to control the molecular weight of oligomers and polymers is known. U.S. Pat. Nos. 5,602,220, 5,770,665 and 5,684,101 as well as WO 9613527 disclose this control, but do not teach α-methylene-γ-butyrolactones or aromatic group formation during catalysis. Commonly owned U.S. Pat. No. 5,726,263, and application Ser. Nos. 08/818,860, 09/193,701 and 08/912,593 also disclose this control, but again, do not disclose this particular monomer or aromatic groups formed during catalysis.

SUMMARY OF THE INVENTION

This invention relates to a process for oligomerizing or polymerizing or copolymerizing (α-methylene-γ-butyrolactones to poly(α-methylene-γ-butyrolactones) having controlled molecular weight and aromatic functionality, wherein the process comprises contacting an α-methylene-γ-butyrolactone, optionally in the presence of a comonomer, with a free radical initiator and a cobalt chain transfer catalyst, said α-methylene-γ-butyrolactone having a structure:

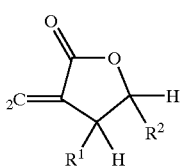

II wherein $R^1$ and $R^2$ are each independently selected from the group (I) consisting of H, —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl and substituted aryl; wherein when $R^1$ or $R^2$ are selected from group (II), $R^1$ and $R^2$ may optionally form a cyclic structure; $R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl, substituted alkyl or substituted aryl; and wherein the alkyl and substituted alkyl are $C_1$–$C_{12}$, and the substituents on the substituted alkyl or substituted aryl contain no functionality which would substantially interfere with free radical polymerization; said process carried out at a temperature from about room temperature to about 240° C., optionally in the presence of a solvent.

This invention further relates to the cooligomerization of α-methylene-γ-butyrolactones with comonomers selected from the group consisting of acrylonitrile, methacrylonitrile, vinyl methyl ketone, 4-chlorostyrene, 4-chloromethylstyrene, 2,3-dimethylstyrene, 3,4-dichlorostyrene, 4-bromostyrene, 4-hydroxystyrene, 4-methoxystyrene, 4-oxymethylstyrene, 4-bromomethylstyrene, 4-styrenesulfonic acid, sodium salt of 4-styrenesulfonic acid, 4-styrenesulfonyl chloride, methyl acrylate, ethyl acrylate, propyl acrylate, 2-hydroxyethyl acrylate, 3-hydroxypropyl acrylate, 2-hydroxypropyl acrylate, butyl acrylate, amyl acrylate, hexyl acrylate, 2-ethylhexyl acrylate, nonyl acrylate, dodecyl acrylate, glycidyl acrylate, acrylamide, N,N'-dimethylacrylamide, bisacrylamide, 2-acrylamido-2-methyl-1-propanesulfonic acid, acrylic acid, sodium salt of acrylic acid, zinc salt of acrylic acid, acryloyl chloride, [2-(acryloyloxy)ethyl] trimethyl ammonium chloride, 2-ethyloxyethyl acrylate, 2-(N,N'-dimethylamino)-ethyl acrylate, methacryloyl chloride, methacrylic anhydride, acrylic anhydride, [2-(methacryloyloxy)ethyl]trimethyl ammonium chloride, 2-(methacryloyloxy)ethyl methacrylate, 2-(methacryloyloxy)ethylacetoacetate, [2-(methacryloyloxy)propyl]-trimethyl ammonium chloride, vinylchloride, 4-vinylbenzoic acid, vinyl acrylate, vinyl methacrylate, vinyl chloroformate, vinyl pyridine, benzyl acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromide, itaconic acid, itaconic anhydride, dimethyl itaconate, methyl itaconate, N-tert-butyl methacrylamide, N-n-butyl methacrylamide, N-methyl-ol methacrylamide, N-ethyl-ol methacrylamide, isopropenylbenzoic acid (all isomers), diethylamino alpha-methylstyrene (all isomers), para-methyl-alpha-methylstyrene (all isomers), diisopropenylbenzene (all isomers), isopropenylbenzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylate (all isomers), butyl 2-chloromethylacrylate (all isomers), 2-ethylhexyl 2-chloromethylacrylate, isobornyl 2-chloromethylacrylate, vinylpyrrolidone, and substituted α-methyl-γ-butyrolactones of the following structure:

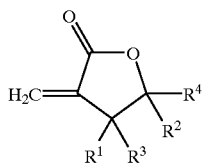

III where $R^1$ and $R^2$ are as defined above, and $R^3$ and $R^4$ are also independently selected from group (I) and group (II), as defined above.

This invention further relates to the products of the processes described.

DETAILS OF THE INVENTION

The use of catalytic chain transfer catalysts in the free radical polymerization of vinylic monomers is widely known and well reflected in the art. See, for example, U.S. Pat. Nos. 5,587,431, 5,362,813, 5,324,879, 5,028,677, and 4,526,945, all incorporated by reference herein. Conducted by cobalt complexes of a very specific structure, the catalysis allows molecular weight (MW) to be effectively controlled. It is also important that these reactions lead to formation of polymers and oligomers with a terminal double bond strictly one bond per polymer molecule (more than 95% ) as found in T. P. Davis, D. M. Haddleton, S. N. Richards., J. M. S.—Rev. Macromol. Chem. Phys., C34 (1994) 243.

A new monomer, α-methylene-γ-butyrolactone, represented in an unsubstituted form is shown in I below,

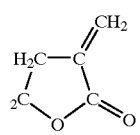

I

Surprisingly it was found that this monomer behaves differently from acrylates or methacrylates, its structural analogues. In case of methacrylates cobalt-catalyzed chain transfer provides polymer with a double bond. Unexpectedly, polymerization of α-methylene-γ-butyrolactone under the same conditions gave an oligomer which have aromatic functionality, as indicated by 7.1–7.4 ppm resonance in the proton NMR spectrum, but no isolated double bonds. The NMR data suggests that the cobalt catalyst causes isomerization of the oligomer and polymer in addition to regular hydrogen abstraction from the propagating radical. Therefore, the resulting oligomers have aromatic functionality but no isolated double bonds.

Hence, cobalt chain transfer catalyst provides not only molecular weight control in α-methylene-γ-butyrolactone polymerization as shown in the examples herein, but also, unusual functionalization,—that is to say aromatic functionalization of the polymeric product.

Until recently, wide usage of α-methylene-γ-butyrolactone was restricted by its high cost. In recent years interest in polymers made using α-methylene-γ-butyrolactone has increased as economically attractive synthetic routes to α-methylene-γ-butyrolactone have been developed. Alpha-methylene-γ-butyrolactone is relatively easy to polymerize and copolymerize by free radical mechanism as described herein, to yield polymers with relatively higher glass transition temperatures, Tg. The homopolymer has a Tg of about 200° C.

Alpha-methylene-γ-butyrolactones have the general formula

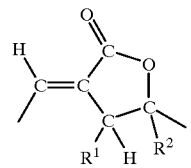

wherein $R^1$ and $R^2$ are each independently selected from the group (I) consisting of H, —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when $R^1$ or $R^2$ are selected from group (II), $R^1$ and $R^2$ may optionally form a cyclic structure;

$R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl substituted alkyl or substituted aryl; and wherein the alkyl and substituted alkyl are $C_1$–$C_{12}$, and the substituents on the substituted alkyl or aryl contain no functionality which would substantially interfere with free radical polymerization (e.g., groups known to be free-radical chain terminators such as thiols or nitroxides).

It is preferred that $R^1$ be methyl and $R^2$ be H, and most preferred that both $R^1$ and $R^2$ be H. $R^1$ and $R^2$ may also form a cyclic structure when at least one of $R^1$ and $R^2$ are one of the substituents listed above in group II. This may be illustrated in the following structure:

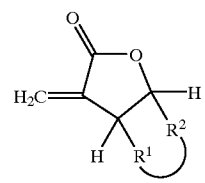

Alpha-methylene-γ-butyrolactone may homooligomerize and homopolymerize. The product of its homooligomerization is a mixture which consists essentially of

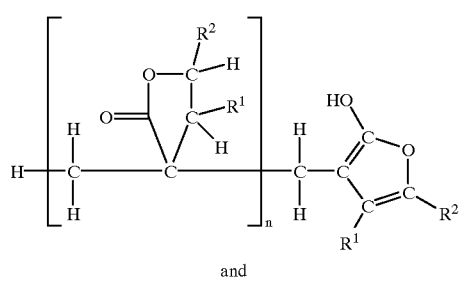

and

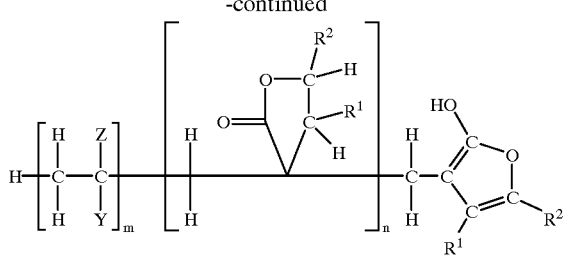

where
m=0–200, n=0–200 and m+n>1;
wherein Y and Z are each independently selected from the group consisting of H, —CH(O), —CN, a halogen, —C(O)OR⁵, —C(O)NR⁶R⁷, —CR⁸(O), —C(O)OC(O)R⁹, —C(O)NR¹¹COR¹¹, —OC(O)R¹², —OR¹³, alkyl, substituted alkyl, aryl, and substituted aryl; Y and Z may be combined in a cyclic structure when Y or Z are C(O)OR⁵, —C(O)NR⁶R⁷, —CR⁸(O), —C(O)OC(O)R⁹, —C(O)NR¹⁰COR¹¹, —OC(O)R¹², —OR¹³, alkyl, substituted alkyl, aryl, or substituted aryl;

R⁵, R⁶, R⁷, R⁸, R⁹, R¹⁰, R¹¹, and R¹² are H, alkyl, aryl, substituted alkyl or substituted aryl; R¹³ is alkyl, aryl, substituted alkyl or substituted aryl; and wherein the alkyl and substituted alkyl are C₁–C₁₂, and the substituents on the substituted alkyl or aryl contain no functionality which would substantially interfere with free radical polymerization (e.g., groups known to be free-radical chain terminators such as thiols or nitroxides). The depiction of the structures is not meant to imply anything about the arrangement of the monomers along the oligomer backbone.

Alpha-methylene-γ-butyrolactone may also co-oligomerize and copolymerize with a variety of monomers and comonomers. These cooligomers would yield products containing >10% of the following structure:

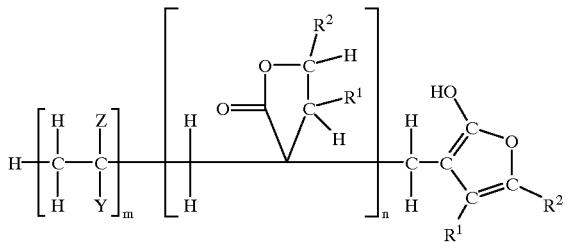

where m=0–200, n=0–200 and m+n>1 and where Y and Z and their substituents are as defined above. The depiction of the structures is not meant to imply anything about the arrangement of the monomers along the oligomer backbone.

Preferred comonomers are: acrylonitrile, methacrylonitrile, vinyl methyl ketone, 4-chlorostyrene, 4-chloromethylstyrene, 2,3-dimethylstyrene, 3,4-dichlorostyrene, 4-bromostyrene, 4-hydroxystyrene, 4-methoxystyrene, 4-oxymethylstyrene, 4-bromomethylstyrene, 4-styrenesulfonic acid, sodium salt of 4-styrenesulfonic acid, 4-styrenesulfonyl chloride, methyl acrylate, ethyl acrylate, propyl acrylate, 2-hydroxyethyl acrylate, 3-hydroxypropyl acrylate, 2-hydroxypropyl acrylate, butyl acrylate, amyl acrylate, hexyl acrylate, 2-ethylhexyl acrylate, nonyl acrylate, dodecyl acrylate, glycidyl acrylate, acrylamide, N,N'-dimethylacrylamide, bisacrylamide, 2-acrylamido-2-methyl-1-propanesulfonic acid, acrylic acid, sodium salt of acrylic acid, zinc salt of acrylic acid, acryloyl chloride, [2-(acryloyloxy)ethyl] trimethyl ammonium chloride, 2-ethyloxyethyl acrylate, 2-(N,N'-dimethylamino)-ethyl acrylate, methacryloyl chloride, methacrylic anhydride, acrylic anhydride, [2-(methacryloyloxy)ethyl]-trimethyl ammonium chloride, 2-(methacryloyloxy)ethyl methacrylate, 2-(methacryloyloxy)ethylacetoacetate, [2-(methacryloyloxy)propyl]-trimethyl ammonium chloride, vinylchloride, 4-vinylbenzoic acid, vinyl acrylate, vinyl methacrylate, vinyl chloroformate, vinyl pyridine, benzyl acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromide, itaconic acid, itaconic anhydride, dimethyl itaconate, methyl itaconate, N-tert-butyl methacrylamide, N-n-butyl methacrylamide, N-methyl-ol methacrylamide, N-ethyl-ol methacrylamide, isopropenylbenzoic acid (all isomers), diethylamino alpha-methylstyrene (all isomers), para-methyl-alpha-methylstyrene (all isomers), diisopropenylbenzene (all isomers), isopropenylbenzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylate (all isomers), butyl 2-chloromethylacrylate (all isomers), 2-ethylhexyl 2-chloromethylacrylate, isobornyl 2-chloromethylacrylate, vinylpyrrolidone, and substituted α-methyl-γ-butyrolactones of the following structure:

III

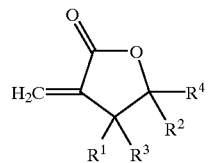

where R¹ and R² are as defined above, and R³ and R⁴ are also independently selected from group (I) and group (II), as defined above.

Preferred metallic chain transfer catalysts for use in making the present materials are cobalt (II) and cobalt (III) chelates. Examples of such cobalt compounds are disclosed in U.S. Pat. Nos. 4,680,352, 4,694,054, 5,324,879, WO 87/03605 published Jun. 18, 1987, U.S. Pat. Nos. 5,362,826, and 5,264,530. Other useful cobalt compounds (cobalt complexes of porphyrins, phthalocyanines, tetraazoporphyrins, and cobaloximes) are respectively disclosed in Enikolopov, N. S., et al., USSR Patent 664,434 (1978); Golikov, I., et al., USSR Patent 856,096 (1979); Belgovskii, I. M., USSR Patent 871,378 (1979); and Belgovskii, I. M., et al., USSR Patent 1,306,085 (1986). These catalysts operate at close to diffusion-controlled rates and are effective at part-per-million concentrations. Examples of these cobalt (II) and cobalt (III) chain transfer catalysts include, but are not limited to, those represented by the following structures:

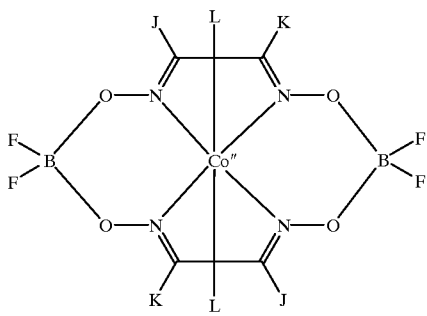

Co(II)(DPG-BF$_2$)$_2$, where J=K=Ph, L=ligand
Co(II)(DMG-BF$_2$)$_2$, where J=K=Me, L=ligand
Co(II)(EMG-BF$_2$)$_2$, where J=Me, K=Et, L=ligand
Co(II)(DEG-BF$_2$)$_2$, where J=K=Et, L=ligand
Co(II)(CHG-BF$_2$)$_2$, where J=K=—(CH$_2$)$_4$—, L=ligand

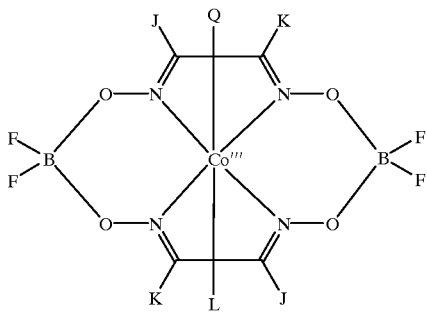

QCo(III)(DPG-BF$_2$)$_2$, where J=K=Ph, R=alkyl, L=ligand
QCo(III)(DMG-BF$_2$)$_2$, where J=K=Me, R=alkyl, L=ligand
QCo(III)(DMG-BF$_2$)$_2$, where J=Me, K=Et, R=alkyl, L=ligand
QCo(III)(DEG-BF$_2$)$_2$, where J=K=Et, R=alkyl, L=ligand
QCo(III)(CHG-BF$_2$)$_2$, where J=K=—(CH$_2$)$_4$-, R=alkyl, L=ligand
QCo(III)(DMG-BF$_2$)$_2$, where J=K=Me, R=halogen, L=ligand L can be a variety of additional neutral ligands commonly known in coordination chemistry. Examples include water, amines, ammonia, and phosphines. The catalysts can also include cobalt complexes of a variety of porphyrin molecules such as tetraphenylporphyrin, tetraanisylporphyrin, tetramesitylporphyrin and other substituted porphyrin species. Q is an organic radical (e.g., alkyl or substituted alkyl). The preferred Q groups are isopropyl, 1-cyanoethyl, and 1-carbomethoxyethyl.

The chain transfer catalyst herein designated COBF represents the family of chemicals defined by Bis-[(1,2-diR*-ethanedioximato)(2-)O:O'-tetrafluorodiborato(2-)-N'N"N'"N""](A)(B)cobalt(III), where R* is alkyl, aryl or substituted aryl, A is an alkyl or substituted alkyl ligand or an acido ligand (e.g., chloro, bromo), and B is a Lewis base (e.g., water, pyridine. imidazole, phosphine, as well as their derivatives). It is preferred that R* is methyl, A is isopropyl and B is water.

An initiator which produces carbon-centered radicals, sufficiently mild so as not to destroy the metal chelate chain transfer catalyst, is typically also employed in preparing the polymers. Suitable initiators are azo compounds having the requisite solubility and appropriate half life, including azocumene; 2,2'-azobis(2-methyl)-butanenitrile; 2,2'-azobis(isobutyronitrile)(AIBN); 4,4'-azobis(4-cyanovaleric acid); 2-(t-butylazo)-2-cyanopropane; 1,1'-azobis(cyclohexane-1-carbonitrile) and other compounds known to those skilled in the art.

The polymerization process, employing the above described metallic chain transfer catalysts, is carried out suitably at a temperature ranging from about room temperature to about 240° C. or higher, preferably about 50° C. to 150° C. The polymers made by the inventive process are typically prepared in a polymerization reaction by standard solution polymerization techniques, but may also be prepared by emulsion, suspension or bulk polymerization processes. The polymerization process can be carried out as either a batch, semi-batch, or continuous process (CSTR). When carried out in the batch process, the reactor is typically charged with metal chain transfer catalyst, a monomer, optionally with a solvent. To the mixture is then added the desired amount of initiator, typically such that the monomer-to-initiator ratio is 5 to 1000. The mixture is then heated for the requisite time, usually from about 30 minutes to about 12 hours. In a batch process, the reaction may be run under pressure to avoid monomer reflux.

As indicated above, the polymerization can be carried out in the absence of, or in the presence of, any medium or solvent suitable for free-radical polymerization, including, but not limited to, ketones such as acetone, butanone, pentanone and hexanone; alcohols such as isopropanol; amides such as dimethyl formamide; aromatic hydrocarbons such as toluene and xylene; ethers such as tetrahydrofuran and diethyl ether; ethylene glycol; dialkyl ethers such as CELLOSOLVES® solvent, alkyl esters or mixed ester ethers such as monoalkyl ether-monoalkanoates; and mixtures of two or more solvents.

The oligomers, polymers and/or copolymers prepared according to the present invention can be employed, not only as non-metallic chain transfer agents, but as useful components or intermediates in the production of graft copolymers, non-aqueous dispersed polymers, block copolymers, microgels, star polymers, branched polymers, and ladder polymers.

Aromatic groups formed in poly($\alpha$-methylene-$\gamma$-butyrolactone) and copolymers comprised of $\alpha$-methylene-$\gamma$-butyrolactone can be further transformed into amino, nitro, sulfo, and other groups applying well known synthetic methods. See generally J. March, "Advanced Organic Chemistry: Reactions, Mechanisms and Structure", 4th ed., Wiley Interscience, New York, 1992, p. 641. Such polymers can be used as compatibilizers, surfactants, dispersants, emulsifiers and building blocks in the syntheses of liquid crystals, adhesives. block- and graft-copolymers.

Oligomers, macromonomers and polymers made by the present process are useful in a wide variety of coating and molding resins. Polymers, such as those produced in this invention would find use in, for example, structured polymers for use as pigment dispersants. Other potential uses can include cast, blown, spun or sprayed applications in fiber, film, sheet, composite materials, multilayer coatings, photopolymerizable materials, photoresists, surface active agents, dispersants, adhesives, adhesion promoters, coupling agents, and others. End products taking advantage of available characteristics can include, for example, automotive and architectural coatings or finishes, including high solids, aqueous, or solvent based finishes.

EXAMPLES

The freeze-pump-thaw cycle as used in the examples below is described in D. F. Shriver, et al., "The Manipulation of Air Sensitive Compounds", 2nd ed., Wiley Interscience, 1986.

$^1$H-NMR spectra were taken on a QE300 NMR spectrometer (General Electric Co., Freemont, Calif. 94539) at 300 MHz frequency.

K$^{30}$ IDS mass spectroscopy is an ionization method that produces pseudomolecular ions in the form of [M]K$^+$with little or no fragmentation. Intact organic molecules are desorbed by rapid heating. In the gas phase the organic molecules are ionized by potassium attachment. Potassium ions are generated from an aluminosilicate matrix that contains K$_2$O. All of these experiments were performed on a Finnegan Model 4615 GC/MS quadrupole mass spectrometer (Finnegan MAT (USA), San Jose. Calif.). An electron impact source configuration operating at 200° C. and a source pressure of <1x10$^{-6}$ torr was used.

MW and DP measurements were based on size exclusion chromatography (SEC) using styrene as a standard, and performed on a WISP 712 Chromatograph with 100 A, 500 A, 1000 A and 5000 A phenogel columns (Waters Corp., Marlborough, Mass.).

Unless otherwise specified, all reactant percentages in the Examples below are volume percentages, and unless other specified, all chemicals and reagents in the examples below were used as received from Aldrich Chemical Co., Milwaukee, Wis.

Definitions

| | |
|---|---|
| VAZO-67 ® | 2,2'-azobis(2-methylbutyrontitrile) (DuPont Co., Wilmington, DE) |
| VAZO-88 ® | 1,1'-azobis(cyclohexane-1-carbonitrile) (DuPont Co., Wilmington, DE) |
| AIBN | 2,2'-azobis(isobutyronitrile) |
| TAPCo | tetraanisylporphyrine-Co |
| HPCo | hemato-porphyrin-IX-Co tetramethyl ester |

Comparative Example A

No Co CTC Used

A degassed 50% solution of α-methylene-γ-butyrolactone in 1,2-dichloroethane with 3.25 g/l of AIBN as an initiator was kept for 2 hours at 60° C. During polymerization white polymer precipitated from the solution. The polymer was collected and dried in high vacuum. Proton NMR spectroscopy of poly(α-methylene-γ-butyrolactone) detected some residual monomer (6.07 and 5.74 ppm) or no aromatic species. Size exclusion chromatography (SEC) showed that the number average molecular weight of the product, $M_n$=101,000 and weight average molecular weight was $M_n$=210,000.

Example 1

Co CTC Used

A degassed 50% solution of α-methylene-γ-butyrolactone in 1,2-dichloroethane with 3.25 g/l of AIBN as an initiator and 0.05 g/l of TAPCo as a chain transfer agent was kept for 8 hours at 60° C. The reaction mixture was evaporated under high vacuum and resulted in a viscous liquid. Proton NMR spectroscopy detected no residual monomer but did show a substantial amount of aromatic species, as indicated by 7.15, 7.38 and 7.4 ppm resonance. SEC showed that the number average molecular weight of the product was $M_n$<3500.

Example 2

Higher Concentration of Co CTC Used

A degassed 50% solution of α-methylene-γ-butyrolactone in 1,2-dichloroethane with 3.25 g/l of AIBN as an initiator and 0.01 g/l of TAPCo as a chain transfer agent was kept at 60° C. until polymerization was complete, i.e., when the reaction no longer produced heat. The reaction mixture was evaporated under high vacuum and resulted in a viscous liquid. Proton NMR spectroscopy detected no residual monomer but indicated some aromatic species with proton signals at 7.3–7.7 ppm region. SEC indicated that the number average degree of polymerization, $DP_n$=38. Comparison of the NMR signals gives 1:14 ratio between aromatic protons (>7.1 ppm) and aliphatic —CH$_2$O— protons (4.2–5.0 ppm) in the polymer. This ratio increases as $DP_n$ decreases, indicating that the number of aromatic protons is likely to be constant per polymer chain. Since the Co CTC terminates the propagation of the radicals, but no vinylic protons are formed, it was concluded that the aromatic group is located at the end of the polymer.

Example 3

Copolymerization of α-methylene-γ-butyrolactone with methyl acrylate with Co CTC A degassed 1,2-dichloroethane solution containing 17% α-methylene-γ-butyrolactone and 33% methyl acrylate with 3 g/l of VAZO®-88 as an initiator and 0.02 g/l of COBF as a chain transfer agent was kept at 90° C. for 8 hours. The reaction mixture was evaporated in high vacuum to give transparent polymer. Proton NMR spectroscopy of the polymer detected no residual monomer or other vinylic species but did detect some aromatic species with proton signals at 7.1–7.4 ppm region. K$^+$IDS analysis that about 70% of the polymer product contain one α-methylene-γ-butyrolactone unit per chain.

Comparative Example B

Copolymerization of α-methylene-γ-butyrolactone with Methyl Acrylate without Co CTC A degassed 1,2-dichloroethane solution containing 17% α-methylene-γ-butyrolactone and 33% methyl acrylate with 3 g/l of VAZO®-88 as an initiator was kept at 90° C. for 8 hours as in Example 3 above. No Co chain transfer catalyst was used. High molecular weight (greater than 40,000 Daltons) polymer was obtained with no significant signals in the aromatic proton region.

Example 4

Copolymerization of α-methylene-γ-butyrolactone with Methyl Vinylidene Chloride with Co CTC A degassed 1,2-dichloroethane solution containing the 12% α-methylene-γ-butyrolactone, 37% methyl vinylidene chloride with 4.5 g/l of VAZO®-67 as an initiator and 0.02 g/l of HPCo as a chain transfer catalyst, was kept at 70° C.

for 8 hours. The reaction mixture was filtered and evaporated under high vacuum and resulted in a viscous liquid. Proton NMR spectroscopy detected no residual monomer or other vinylic species, but did detect some aromatic species with proton signals at 7.1–7.5 ppm region. K+IDS analysis showed that the product consisted mostly of vinylidene chloride/α-methylene-γ-butyrolactone dimer.

Comparative Example C

Co-polymerization of α-methylene-γ-butyrolactone with Methyl Vinylidene Chloride without Co CTC A degassed 1,2-dichloroethane solution containing 12% α-methylene-γ-butyrolactone, 37% methyl vinylidene chloride with 4.5 g/l of VAZO®-67 as an initiator was kept at 70° C. for 8 hours as in Example 4 above. No Co chain transfer catalyst was used. High molecular weight (greater than 40,000 Daltons) polymer was obtained with no significant signals aromatic proton region.

What is claimed is:

1. A process for oligomerizing or polymerizing or copolymerizing α-methylene-γ-butyrolactones to poly(α-methylene-γ-butyrolactones) having controlled molecular weight and aromatic functionality, wherein the process comprises:

contacting an α-methylene-γ-butyrolactone, optionally in the presence of a comonomer, with a free radical initiator and a cobalt chain transfer catalyst, said α-methylene-γ-butyrolactone having a structure:

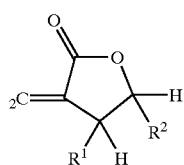

II wherein $R^1$ and $R^2$ are each independently selected from the group (I) consisting of H, —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl and substituted aryl; wherein when $R^1$ or $R^2$ are selected from group (II), $R^1$ and $R^2$ may optionally form a cyclic structure;

$R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl, substituted alkyl or substituted aryl;

and wherein the alkyl and substituted alkyl are $C_1$–$C_{12}$, and the substituents on the substituted alkyl or substituted aryl contain no functionality which would substantially interfere with free radical polymerization;

said process carried out at a temperature from about room temperature to about 240° C., optionally in the presence of a solvent.

2. The process of claim 1, wherein $R^1$ is methyl and $R^2$ is H.

3. The process of claim 1, wherein both $R^1$ and $R^2$ are H.

4. The process of claim 1, 2 or 3, wherein the temperature is about 50° C. to 150° C.

5. The process of claim 1, wherein the cobalt chain transfer catalyst is selected from the group consisting of cobalt (II) and cobalt (III) chelates or a mixture thereof.

6. The process as recited in claim 1, wherein said process is a batch process.

7. The process of claim 1, wherein said process is a semi-batch process.

8. The process of claim 1, wherein said process is a continuous process.

9. The process of claim 1, wherein the initiator is an azo compound.

10. The process of claim 9, wherein the initiator is selected from the group consisting of azocumene; 2,2'-azobis(2-methyl)-butanenitrile; 2,2'-azobis(isobutyronitrile) (AIBN); 4,4'-azobis(4-cyanovaleric acid); 2-(t-butylazo)-2-cyanopropane, and 1,1'-azobis(cyclohexane-1-carbonitrile).

11. The process of claim 1 wherein the process is conducted in the presence of a solvent selected from the group consisting of ketones such as acetone, butanone, pentanone and hexanone; alcohols such as isopropanol; amides such as dimethyl formamide; aromatic hydrocarbons such as toluene and xylene; ethers such as tetrahydrofuran and diethyl ether; ethylene glycol; dialkyl ethers alkyl esters or mixed ester ethers such as monoalkyl ether-monoalkanoates; and mixtures of two or more solvents.

12. The product of the process of claim 1.

13. A composition of matter consisting essentially of a mixture of compounds having the structure

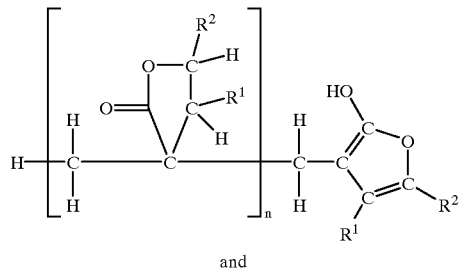

and

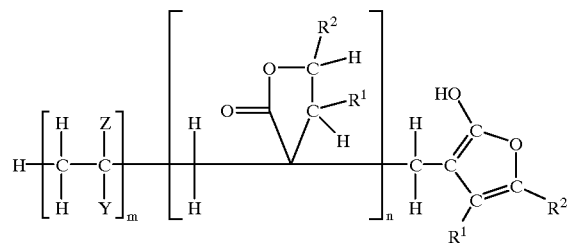

where m=0–200, n=0–200 and m+n>1;

wherein $R^1$ and $R^2$ are each independently selected from the group (I) consisting of H, —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl and substituted aryl; wherein when $R^1$ or $R^2$ are selected from group (II), $R^1$ and $R^2$ may optionally form a cyclic structure; $R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl, substituted alkyl or substituted aryl; and wherein the alkyl and substituted alkyl are $C_1$–$C_{12}$, and the substituents on the substituted alkyl or substituted aryl contain no functionality which would substantially interfere with free radical polymerization; said process carried out at a temperature from about room temperature to about 240° C., optionally in the presence of a solvent;

wherein Y and Z are each independently selected from the group consisting of H, —CH(O), —CN, halogen, —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; Y and Z may be combined in a cyclic structure when Y or Z are C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, or substituted aryl;

R$^5$, R$^6$, R$^7$, R$^8$, R$^9$, R$^{10}$, R$^{11}$, and R$^{12}$ are H, alkyl, aryl, substituted alkyl or substituted aryl; R$^{13}$ is alkyl, aryl, substituted alkyl or substituted aryl; and wherein the alkyl and substituted alkyl are $C_1$–$C_{12}$, and the substituents on the substituted alkyl or substituted aryl contain no functionality which would substantially interfere with free radical polymerization.

14. The process of claim 1, wherein a comonomer is used and the comonomer is selected from the group consisting of acrylonitrile, methacrylonitrile, vinyl methyl ketone, 4-chlorostyrene, 4-chloromethylstyrene, 2,3-dimethylstyrene, 3,4-dichlorostyrene, 4-bromostyrene, 4-hydroxystyrene, 4-methoxystyrene, 4-oxymethylstyrene, 4-bromomethylstyrene, 4-styrenesulfonic acid, sodium salt of 4-styrenesulfonic acid, 4-styrenesulfonyl chloride, methyl acrylate, ethyl acrylate, propyl acrylate, 2-hydroxyethyl acrylate, 3-hydroxypropyl acrylate, 2-hydroxypropyl acrylate, butyl acrylate, amyl acrylate, hexyl acrylate, 2-ethylhexyl acrylate, nonyl acrylate, dodecyl acrylate, glycidyl acrylate, acrylamide, N,N'-dimethylacrylamide, bisacrylamide, 2-acrylamido-2-methyl-1-propanesulfonic acid, acrylic acid, sodium salt of acrylic acid, zinc salt of acrylic acid, acryloyl chloride, [2-(acryloyloxy)ethyl] trimethyl ammonium chloride, 2-ethyloxyethyl acrylate, 2-(N,N'-dimethylamino)-ethyl acrylate, methacryloyl chloride, methacrylic anhydride, acrylic anhydride, [2-(methacryloyloxy)ethyl]-trimethyl ammonium chloride, 2-(methacryloyloxy)ethyl methacrylate, 2-(methacryloyloxy)ethylacetoacetate, [2-(methacryloyloxy)propyl]-trimethyl ammonium chloride, vinylchloride, 4-vinylbenzoic acid, vinyl acrylate, vinyl methacrylate, vinyl chloroformate, vinyl pyridine, benzyl acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromide, itaconic acid, itaconic anhydride, dimethyl itaconate, methyl itaconate, N-tert-butyl methacrylamide, N-n-butyl methacrylamide, N-methyl-ol methacrylamide, N-ethyl-ol methacrylamide, isopropenylbenzoic acid (all isomers), diethylamino alpha-methylstyrene (all isomers), para-methyl-alpha-methylstyrene (all isomers), diisopropenylbenzene (all isomers), isopropenyl-benzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylate (all isomers), butyl 2-chloromethylacrylate (all isomers), 2-ethylhexyl 2-chloromethylacrylate, isobornyl 2-chloromethylacrylate, vinylpyrrolidone, and substituted α-methyl-γ-butyrolactones of the following structure:

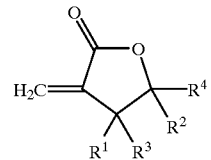

III where R$^1$ and R$^2$ are as defined above, and R$^3$ and R$^3$ is also independently selected from the same groups as R$^1$ and R$^2$.

15. An oligomer of the structure

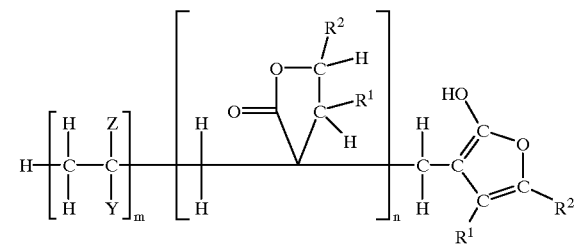

where
m=0–200, n=0–200 and m+n>1;
wherein R$^1$ and R$^2$ are each independently selected from the group (I) consisting of H, —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl and substituted aryl; wherein when R$^1$ or R$^2$ are selected from group (II), R$^1$ and R$^2$ may optionally form a cyclic structure; R$^5$, R$^6$, R$^7$, R$^8$, R$^9$, R$^{10}$, R$^{11}$, and R$^{12}$ are H, alkyl, aryl, substituted alkyl or substituted aryl; R$^{13}$ is alkyl, aryl, substituted alkyl or substituted aryl; and wherein the alkyl and substituted alkyl are $C_1$–$C_{12}$, and the substituents on the substituted alkyl or substituted aryl contain no functionality which would substantially interfere with free radical polymerization; said process carried out at a temperature from about room temperature to about 240° C., optionally in the presence of a solvent;

where Y and Z are each independently selected from the group consisting of H, —CH(O), —CN, halogen, —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; Y and Z may be combined in a cyclic structure when Y or Z are C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, or substituted aryl;

R$^5$, R$^6$, R$^7$, R$^8$, R$^9$, R$^{10}$, R$^{11}$, and R$^{12}$ are H, alkyl, aryl, substituted alkyl or substituted aryl; R$^{13}$ is alkyl, aryl, substituted alkyl or substituted aryl; and wherein the alkyl and substituted alkyl are $C_1$–$C_{12}$, and the substituents on the substituted alkyl or aryl contain no functionality which would substantially interfere with free radical polymerization.

* * * * *